United States Patent [19]

Park

[11] Patent Number: 5,406,736
[45] Date of Patent: Apr. 18, 1995

[54] INTERNAL FISHLINE TYPE FISHING ROD HAVING FISHLINE GUIDER

[75] Inventor: Bo K. Park, Pusan, Rep. of Korea

[73] Assignee: Silver Star Co., Ltd., Pusan, Rep. of Korea

[21] Appl. No.: 213,421

[22] Filed: Mar. 14, 1994

[30] Foreign Application Priority Data

Apr. 28, 1993 [KR] Rep. of Korea ............... 1993-7424

[51] Int. Cl.[6] .................. A01K 87/00; A01K 87/04
[52] U.S. Cl. ............................. 43/24; 43/18.1
[58] Field of Search .............................. 43/18.1, 24

[56] References Cited

U.S. PATENT DOCUMENTS

| | | | |
|---|---|---|---|
| 1,595,275 | 8/1926 | White | 43/18.1 |
| 2,282,618 | 5/1942 | Stewart | 43/18.1 |
| 3,222,811 | 12/1965 | Henson | 43/18.1 |

FOREIGN PATENT DOCUMENTS 1526581 9/1978 United Kingdom ............... 43/24

Primary Examiner—Kurt Rowan
Attorney, Agent, or Firm—Richard T. Holzmann

[57] ABSTRACT

An internal fishline type fishing rod having a fishline guider. The fishing rod includes a hollow fishing rod body having a longitudinal opening. A guider support member is tightly received about the rod body such that it is placed about the opening. This support member has a recessed flat section of which the opposed sides are provided with guide rails. A fishline guider body, having a slant fishline guide hole and being provided with a pair of ceramic guide rings on opposed ends of the guide hole, is engaged with the support member. Opposed guide slots of the guider body are inserted into the guide rails of the support member such that the slant fishline guide hole is received in the hollow rod body through the opening of the rod body. A fixture is tightly received about the rod body such that it blocks the guider body insert end of the support member, so that it prevents the guider body from separation from the support member.

4 Claims, 1 Drawing Sheet

INTERNAL FISHLINE TYPE FISHING ROD HAVING FISHLINE GUIDER

FIELD OF THE INVENTION

The present invention relates in general to an internal fishline type fishing rod and, more particularly, to such a rod having a fishline guider for introducing the fishline into the fishline path of a hollow fishing rod body.

BACKGROUND OF THE INVENTION

It has been noted that a conventional external fishline type fishing rod, wherein the fishline is exposed to the outside, exhibits several problems caused by this exposure. In order to overcome the problems of the external fishline type fishing rod, there have been proposed internal fishline type fishing rods such as disclosed in Japanese Patent Laid-Open Publication Nos. Sho. 56-127032 and Heisei. 4-248945. Each of the above internal fishline type fishing rods guides the fishline into the fishline path of a hollow fishing rod body in order to cause the fishline to come out of the distal end of the fishing rod body, thereby hiding the fishline from view.

This type of fishing rod is preferably provided with a fishline guider for introducing the fishline from a spinning reel into the fishline path of the fishing rod body. The fishline guider comprises an inclined fishline guide member which is mounted on the fishing rod body such that it communicates with the fishline path of the hollow fishing rod body through a longitudinal opening formed on the fishing rod body. In order to mount the fishline guider on the fishing rod body, the guider is positioned about the longitudinal opening of the fishing rod body in order to achieve the communication of the guider with the fishline path and, thereafter, this guider is fixed to the fishing rod body by bonding using an adhesive or by tightly winding thread on the guider together with a corresponding part of the fishing rod body. However, in order to produce the internal fishline type fishing rods having such fishline guiders, a highly skilled technique is required. Thus, the above fishing rods are not produced in commercial quantity.

SUMMARY OF THE INVENTION

It is, therefore, an object of the present invention to provide an internal fishline type fishing rod having a fishline guider in which the aforementioned problems can be overcome by forming a longitudinal opening on a hollow fishing rod body and tightly receiving a guider support member, having opposed guide rails about the longitudinal opening of the fishing rod body and bringing a fishline guider body having a slant fishline guide hole into engagement with the support member by inserting its opposed guide slots into the guide rails of the support member.

In order to accomplish the above object, an internal fishline type fishing rod having a fishline guider in accordance with the present invention comprises: a hollow fishing rod body having a longitudinal opening thereon; a guider support member tightly received about the rod body such that it is placed about the longitudinal opening, the support member having a recessed opening flat section at a position corresponding to the longitudinal opening of the rod body, opposed sides of the recessed flat section being provided with guide rails; a fishline guider body having a slant fishline guide hole and being provided with a pair of ceramic rings received in steps provided on opposed ends of the guide hole, the guider body being engaged with the support member by inserting its opposed guide slots into the guide rails of the support member such that the slant fishline guide hole is received in the hollow rod body through the longitudinal opening of the rod body; and a fixture for prevention of the guider body from separation from the support member, the fixture being tightly received about the rod body such that it blocks the guider body insert end of the support member.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
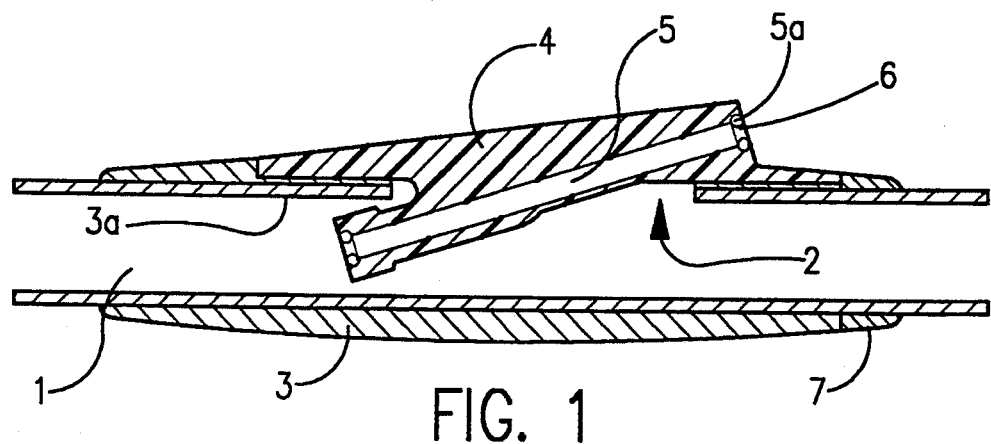
FIG.1 is a partially longitudinal sectional view of an internal fishline type fishing rod having a fishline guider in accordance with the present invention.
Figure 2:
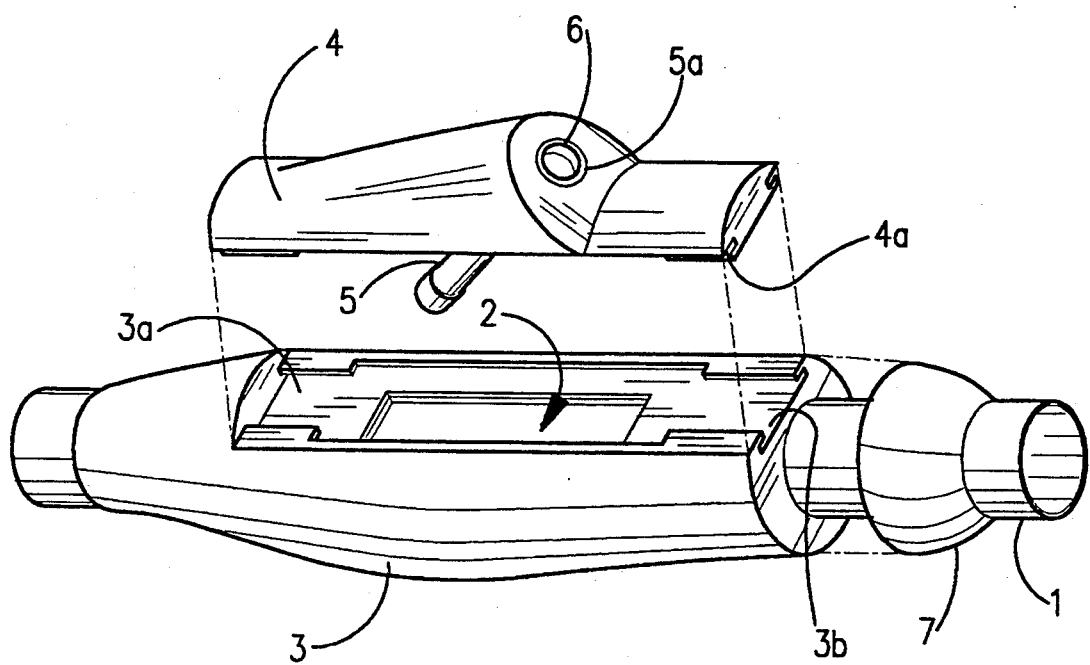
FIG.2 is an exploded perspective view of the fishing rod before engaging a fishline guider body with a guider support member tightly received about a hollow fishing rod body.

With reference to FIGS. 1 and 2, there is shown an internal fishline type fishing rod having a fishline guider in accordance with an embodiment of the present invention. The fishing rod includes a hollow fishing rod body 1 having a longitudinal opening 2 on an appropriate position thereof. A cylindrical guider support member 3 is tightly received about fishing rod body 1 such that it is placed about opening 2 and does not play about rod body 1. At a position corresponding to opening 2, support member 3 has a recessed flat section 3a for defining a space for receiving a fishline guider body 4. Flat section 3a of support member 3 is provided with an opening for communicating with opening 2 of fishing rod body 1. The axial opposed sides of the recessed flat section of support member 3 are provided with their respective guide rails 3b. Fishine guider body 4 has a slant fishline guide hole 5 and a pair of ceramic guide rings 6 respectively received on opposed ends of guide hole 5. In order to receive ceramic rings 6 which are adapted to achieve a desired smooth passing of the fishline through guide hole 5 and prevention of frictional abrasion of the opposed ends of guide hole 5, guide hole 5 is formed with steps 5a at its opposed ends. The axial opposed side of fishline guider body 4 is provided with axial guide slots 4a. When bringing guider body 4 into sliding engagement with support member 3, the opposed guide slots 4a of guider body 4 are inserted about guide rails 3b of support member respectively. In order to prevent guider body 4 from separation from support member 3, an annular fixture 7 is tightly received about fishing rod body 1 such that it blocks the guider body insert end of support member 3.

Hereinafter, the operational effect of the above fishing rod having the fishline guider is given.

As described above, guider support member 3 is tightly received about fishing rod body 1 such that it is placed about opening 2 of rod body 1. Thereafter, guider body 4 is brought into engagement with support member 3 by inserting opposed guide slots 4a of guider body 4 about guide rails 3b of support member 3. When guider body 4 slides into engagement with support member 3, slant fishline guide hole 5 of guider body 4 is placed inside hollow rod body 1. Annular fixture 7 is, thereafter, tightly received about rod body 1 such that it blocks the guider body insert end of support member 3. Hence, guider body 4 is prevented from inadvertent separation from support member 3.

In fishing using the above fishing rod, the fishline unwound from a spinning reel (not shown) is received by fishline guide hole 5 of guider body 4 in order to pass through the hollow fishing rod body 1 and to exit the distal end of rod body 1. In this case, the fishline is guided by the pair of ceramic rings 6 received in the opposed ends of guide hole 5 and, as a result, little or no friction is generated when the fishline passes through guide hole 5, thus to extend the lifetime of the rod and line.

In production of the fishing rod of this invention, the fishing rod elements, that is, guider support member 3 and guider body 4 are separately produced, so that the internal fishline type fishing rod of this invention is simply and uniformly produced in commercial quantity.

In assembling the above fishing rod elements into the resulting fishing rod, support member 3 is tightly received about fishing rod body 1. Thereafter, guider body 4 is brought into engagement with support member 3 by inserting guide slots 4a of body 4 about guide rails 3b of member 3. In addition, guider body 4 placed in support member 3 is reliably retained in its position by annular fixture 7, so that there is no play between support member 3 and guider body 4.

As described above, in the present invention the fishing rod elements, that is, a hollow fishing rod body, a guider support member and a guider body, are separately produced and easily assembled into the resulting fishing rod by tightly receiving the support member about the fishing rod and engaging the guider body with the support member, thereby simplifying production of an internal fishline type fishing rod having a fishline guider and to produce such fishing rods in commercial quantity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An internal fishline type fishing rod having a fishline guider comprising:
   a hollow fishing rod body having a longitudinal opening thereon;
   a guider support member having guider body insert end, tightly received about said rod body such that it placed about said longitudinal opening;
   a fishline guider body having a slant fishline guide hole being engaged with said support member such that said slant fishline guide hole is received in said hollow rod body through said longitudinal opening of the rod body; and
   a fixture for prevention of said guider body from separation from said support member, said fixture being tightly received about said rod body such that it blocks the guider body insert end of said support member.

2. In accordance with claim 1 said support member having a recessed and opening flat section at a position corresponding to said longitudinal opening of said rod body, opposed sides of said recessed flat section being provided with guide rails.

3. In accordance with claim 2 said guider body having opposed axial guide slots therein for insertion into said guide rails of said support member.

4. In accordance with claim 1 said fishline guide hole being provided with a pair of ceramic guide rings received in steps provided on opposed ends of said guide hole.

* * * * *